US008230072B1

(12) United States Patent
Pearson et al.

(10) Patent No.: US 8,230,072 B1
(45) Date of Patent: Jul. 24, 2012

(54) LINKING TO POPULAR NAVIGATION PATHS IN A NETWORK

(75) Inventors: Kirk D. Pearson, Broomfield, CO (US); Michael P. DeJonge, Golden, CO (US)

(73) Assignee: Oracle America, Inc., Redwood City, CA (US)

( * ) Notice: Subject to any disclaimer, the term of this patent is extended or adjusted under 35 U.S.C. 154(b) by 1176 days.

(21) Appl. No.: 11/083,916

(22) Filed: Mar. 18, 2005

(51) Int. Cl.
*G06F 15/16* (2006.01)

(52) U.S. Cl. ........................................................ 709/227

(58) Field of Classification Search .................. 345/619; 707/6, 104.1; 709/227
See application file for complete search history.

(56) References Cited

U.S. PATENT DOCUMENTS

| | | | | |
|---|---|---|---|---|
| 5,870,559 | A * | 2/1999 | Leshem et al. | 709/224 |
| 6,144,962 | A | 11/2000 | Weinberg | |
| 6,321,242 | B1 | 11/2001 | Fogg | |
| 6,489,968 | B1 * | 12/2002 | Ortega et al. | 715/713 |
| 6,954,901 | B1 * | 10/2005 | Desai et al. | 715/745 |
| 6,963,874 | B2 * | 11/2005 | Kasriel et al. | 702/180 |
| 6,981,037 | B1 | 12/2005 | Srikant | |
| 6,993,586 | B2 * | 1/2006 | Chen et al. | 709/228 |
| 7,346,703 | B2 * | 3/2008 | Cope | 709/238 |
| 2003/0078992 | A1 * | 4/2003 | Kirkwood et al. | 709/218 |
| 2003/0131097 | A1 * | 7/2003 | Kasriel et al. | 709/224 |
| 2004/0070606 | A1 * | 4/2004 | Yang et al. | 345/745 |
| 2004/0095383 | A1 * | 5/2004 | Pfeifer et al. | 345/745 |
| 2005/0228775 | A1 * | 10/2005 | Nilsen et al. | 707/2 |
| 2005/0229167 | A1 * | 10/2005 | Henning et al. | 717/143 |
| 2006/0190448 | A1 * | 8/2006 | Bartek et al. | 707/5 |
| 2006/0288023 | A1 * | 12/2006 | Szabo | 707/100 |
| 2007/0005389 | A1 * | 1/2007 | Apparao et al. | 705/1 |
| 2010/0050067 | A1 * | 2/2010 | Curwen et al. | 715/206 |
| 2011/0197115 | A1 * | 8/2011 | Gorelick et al. | 715/205 |

OTHER PUBLICATIONS

Dave; "Browsing Intricately Interconnected Paths;" Conference on Hypertext and Hypermedia Archive Proceedings of the Fourteenth ACM Conference on Hypertext and Hypermedia; 2003; Nottingham, UK.

* cited by examiner

*Primary Examiner* — Douglas Blair
*Assistant Examiner* — Benjamin Ailes
(74) *Attorney, Agent, or Firm* — Robert C. Kowert; Meyertons, Hood, Kivlin, Kowert & Goetzel, P.C.

(57) ABSTRACT

A method for shortening popular navigation paths in a website comprises determining a popular navigation path through a network, identifying a start page and an end page of the popular navigation path, and updating the start page with a link referring to the end page, wherein the updating is performed by a network resource interfaced with the network.

20 Claims, 8 Drawing Sheets

FIG. 4

Navigation Path End Page 405B

New Computer System Patches

Web Page Text

Navigation Path Start Page 405A

Company Home Page

Popular Links 410
New Computer System Patches
[End Page URL (405B)]
Link 2
Link 3

Web Page Text

LINKING TO POPULAR NAVIGATION PATHS IN A NETWORK

FIELD OF INVENTION

An embodiment of the invention relates to computer network operation in general, and more specifically to automatically updating links to popular navigation paths within a network.

BACKGROUND OF INVENTION

In websites larger than a few pages, visitors often view more than one page in the site, and often follow a "navigation path", linking from one page to another through various web pages in a site to get to a web page they are interested in. Some pages in a site may require visitors to follow long navigation paths to find them.

Website designers can change the hierarchy of a website to place important pages near the beginning of a navigation path, but they cannot always know which pages or sections of the website are most important to visitors. Furthermore, website designers do not always know which pages and sections of a website have become more or less important.

Long navigation paths through a website can cause frustration for visitors to the website, and website designers many times do not have an easy way to know which navigation paths need to be shortened. Nor do website designers have an easy way to shorten the navigation paths without manually changing the website.

SUMMARY OF INVENTION

The present invention includes novel methods and apparatus for shortening popular navigation paths in a network.

According to one embodiment of the invention, a method is disclosed. A popular navigation path through a network is determined. A start page and an end page of the popular navigation path are identified. A network resource interfaced with the network updates the start page with a link referring to the end page.

According to another embodiment of the invention, a system is disclosed. The system comprises a processor, a network interface, a means for collecting and aggregating data relating to pages a user visits in a network coupled to the network interface, a means for processing the data to determine a popular navigation path in the network, and a means for updating a start page of the popular navigation path with a link to the end page of the popular navigation path.

BRIEF DESCRIPTION OF THE DRAWINGS

The invention may be best understood by referring to the following description and accompanying drawings that are used to illustrate embodiments of the invention. In the drawings:

FIG. 4 is a block diagram illustrating one embodiment of a navigation path start page and a navigation path end page;

DETAILED DESCRIPTION

Figure 1:
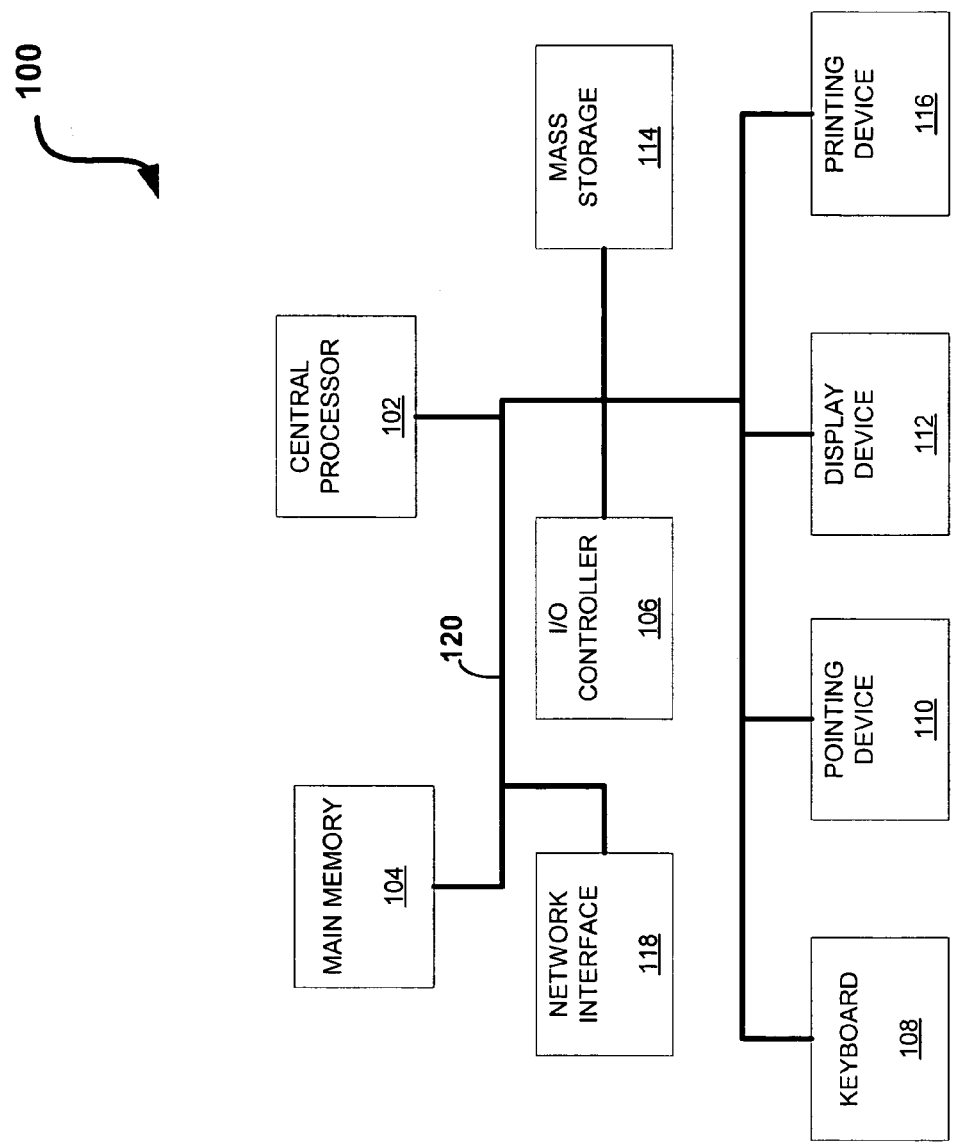
FIG. 1 is an illustration of an embodiment of a computer system.

A method and apparatus are described for shortening popular navigation paths in a network. According to one embodiment of the invention, the method comprises determining a popular navigation path through a network, identifying a start page and an end page of the popular navigation path, and updating the start page with a link referring to the end page via a network resource interfaced with the network.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

FIG. 1 illustrates an exemplary computer system 100 in which certain embodiments of the present invention may be implemented. The system 100 comprises a central processor 102, a main memory 104, an input/output (I/O) controller 106, a keyboard 108, a pointing device 110 (e.g., mouse, track ball, pen device, or the like), a display device 112, a mass storage 114 (e.g., a nonvolatile storage such as a hard disk, an optical drive, and the like), and a network interface 118. Additional input/output devices, such as a printing device 116, may be included in the system 100 as desired. As illustrated, the various components of the system 100 communicate through a system bus 120 or similar architecture.

In a further embodiment, system 100 may be a distributed computing system. In other words, one or more of the various components of the system 100 may be located in a physically separate location than the other components of the system 100. Such components may be accessed and connected via a network to the other components In accordance with an embodiment of the present invention, the computer system 100 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.). Also, instead of a single processor, two or more processors (whether on a single chip or on separate chips) can be utilized to provide speedup in operations. It is further envisioned that the processor 102 may be a complex instruction set computer (CISC) microprocessor, a reduced instruction set computing (RISC) microprocessor, a very long instruction word (VLIW) microprocessor, a processor implementing a combination of instruction sets, and the like.

The network interface 118 provides communication capability with other computer systems on a same local network, on a different network connected via modems and the like to the present network, or to other computers across the Internet. In various embodiments of the present invention, the network interface 118 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 100 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 100 is a general purpose computer capable of running any number of applications such as those available from companies including Oracle, Siebel, Unisys, Microsoft, and the like.

Figure 2:
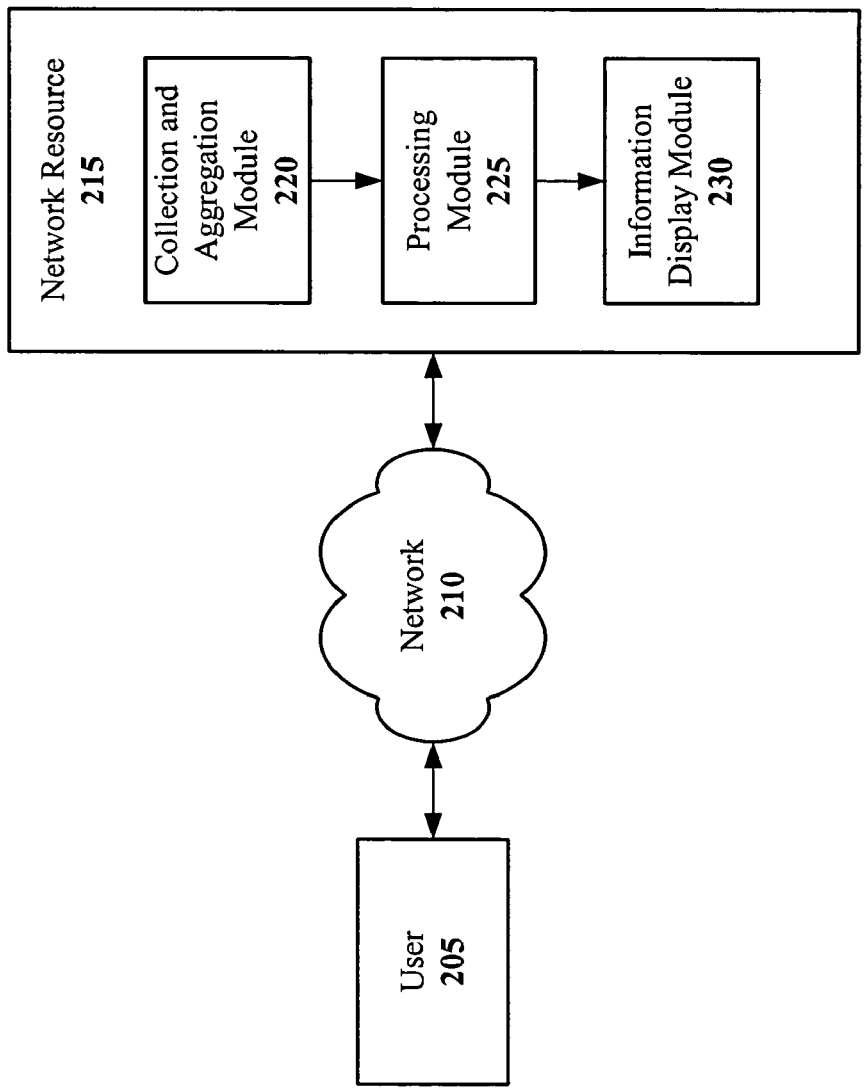
FIG. 2 is a block diagram illustrating one embodiment of a network environment.

FIG. 2 is an illustration of one embodiment of a network in which certain embodiments of the present invention may be implemented. In this illustration, a user 205 is connected through a network 210 to a network resource 215. In one embodiment, the network 210 is the Internet, but embodiments of the invention are not limited to this implementation.

The user 205 accesses one or more files, folders, web pages, or other storage (which are referred to here generally as pages) of the network resource 215 during an access session. In one embodiment, a web page may be coded in one or more of a markup language, extensible markup language, or a scripting language.

During the access session the network resource 215 collects traffic data regarding the pages visited by the user 205 and the navigation paths the user took to reach these pages during the access session. In some embodiments, the user 205 has an opportunity to provide information about their experiences in the access session. This user survey data is collected by network resource 215. In one embodiment, the network resource is a server, but embodiments of the invention are not limited to this implementation.

In one embodiment, collection and aggregation module 220 performs the task of collection and aggregation of the user traffic data and user survey data. Such collection and aggregation includes logging the pages a user visited, the navigation paths a user took through the network, and the user's survey data relating to pages visited in the network. The collection and aggregation module 220 is capable of cataloguing this data for a multitude of users.

Navigation path processing module 225 uses the data collected in the collection and aggregation module 220 to determine popular navigation paths through the network pages. The popular navigation paths determined by navigation path processing module 225 are used by information display module 230 to automatically update a start page of a popular navigation path to include a link to an end page of the popular navigation path. In this manner, the network resource 215 automatically and dynamically shortens navigation paths for the user 205 through a network.

Collection and aggregation module 220, processing module 225, and information display module 230 may be implemented, in some embodiments, in a computer system, such as that exemplified in FIG. 1. In some embodiments, the modules 220, 225, and 230 may be implemented together in one computer system. In other embodiments, the modules 220, 225, and 230 may be implemented each in their own separate computer system. Furthermore, some embodiments of the invention may combine the functionalities of modules 220, 225, and 230 into one module or into a multitude of modules. One skilled in the art will appreciate that there are a variety of implementations that may be desired or necessitated by the various embodiments of the invention.

Figure 3:
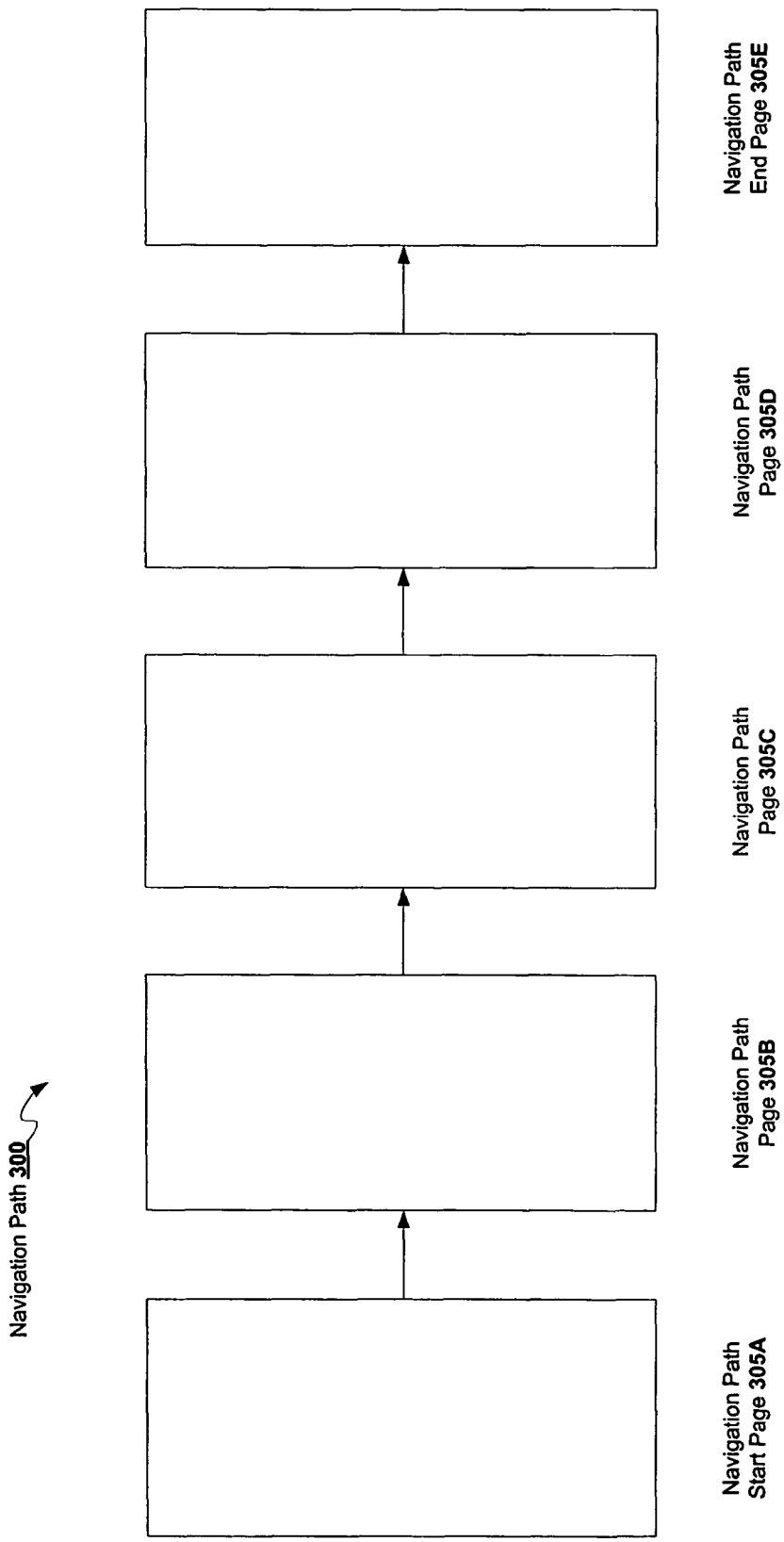
FIG. 3 is a block diagram illustrating one embodiment of a navigation path through a network.

FIG. 3 illustrates an exemplary navigation path 300 through a network. Navigation path 300 may be any of the possible paths a user would take through a network in order to reach a desired destination. Navigation path 300 is one example of the data gathered by collection and aggregation unit 220 of FIG. 2.

Navigation path 300 begins at navigation path start page 305A. From navigation path start page 305A, a user continues to navigation path page 305B. Navigation path pages 305B through 305D are pages that a user visits sequentially in route to the user's final destination, navigation path end page 305E. Navigation path 300 is only one example embodiment of a navigation path a user may take through a network. It should be appreciated that the number of pages in a navigation path may vary, and is not limited to the five pages presented in FIG. 3.

In some embodiments, navigation path end page 305E is the final page a user visits before leaving a network. In other embodiments, navigation path end page 305E may be a page that a user stays on for a predetermined period of time. In yet other embodiments, navigation path end page 305E may be one that is rated highly by user survey data. One skilled in the art will appreciate that navigation path end page 305E may be determined by a variety of different criteria.

FIG. 4 illustrates a more detailed view of a navigation path start page and a navigation path end page of a navigation path through a network. Navigation path start page 405A may, for example, be a company home page where a user would begin. The user would then follow a navigation path through the company's network to reach navigation path end page 405B. Navigation path end page 405B may be, for example, new computer system patches that the company provides.

Embodiments of the present invention automatically track the most popular navigation paths of visitors through a network and create links within the network to shorten these navigation paths. For example, one embodiment of the present invention may automatically update navigation path start page 405A with the Uniform Resource Locator (URL) of navigation path end page 405B in a links section 410 of the navigation start page 405A. This updating, in some embodiments of the invention, only occurs if the navigation path from navigation start page 405A to navigation end page 405B is a popular navigation path through the network.

The automatic updating of the navigation path start page 405A may, in some embodiments, be done through collection and aggregation module 220, processing module 225, and information display module 230 of the network resource 215 of FIG. 2.

Figure 5:
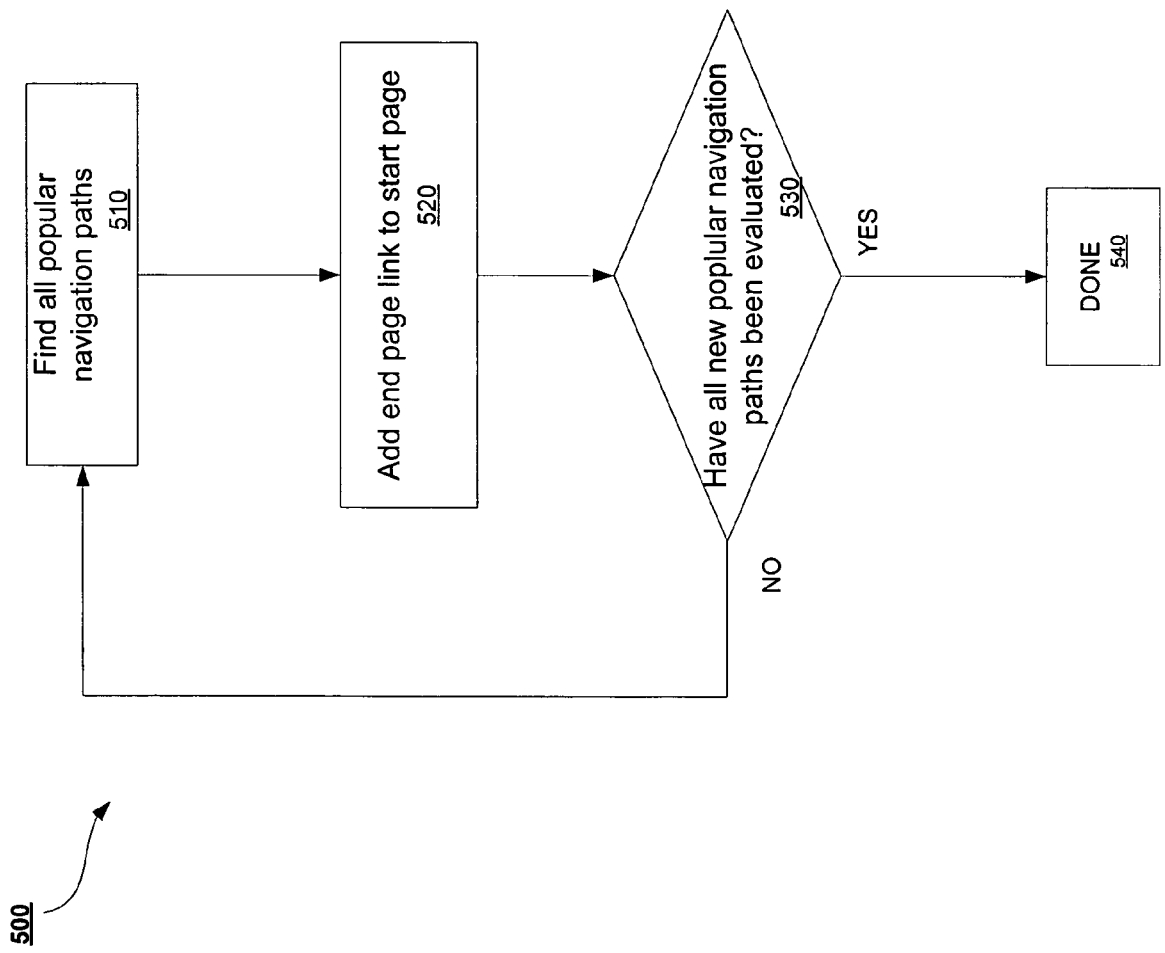
FIG. 5 is a flow diagram depicting a method according to one embodiment of the invention.

FIG. 5 is a flow diagram illustrating one embodiment of a method of the present invention. The method 500 depicts one embodiment of automatically updating a start page of a popular navigation path through a network with a link, or URL, to the end page of the popular navigation path.

At processing block 510, the popular navigation paths through a network are determined. Various tools may be employed to determine popular navigation paths. Such tools may include computer applications developed for this purpose. Also, examination, manual or otherwise, of the server logs of the network may accomplish the task.

Various criteria may be used to determine whether a navigation path is "popular." For example, embodiments of the invention may use criteria such as the number of page visits a page receives, the number of users that view a page, the length of time a page is viewed, or the popularity rank of a page according to user survey results. One skilled in the art will appreciate that embodiments of the invention may be customized to produce different definitions of "popular" navigation paths.

Once the popular navigation paths have been determined, an end page link of a popular navigation path is added to the start page of that popular navigation path 520. At decision block 530, it is determined whether all new popular navigation paths have been evaluated. If all popular navigation paths have not been evaluated, then the process returns to processing block 510 to evaluate another popular navigation path. If all popular navigation paths have been evaluated, then the process ends at processing block 540.

Figure 6:
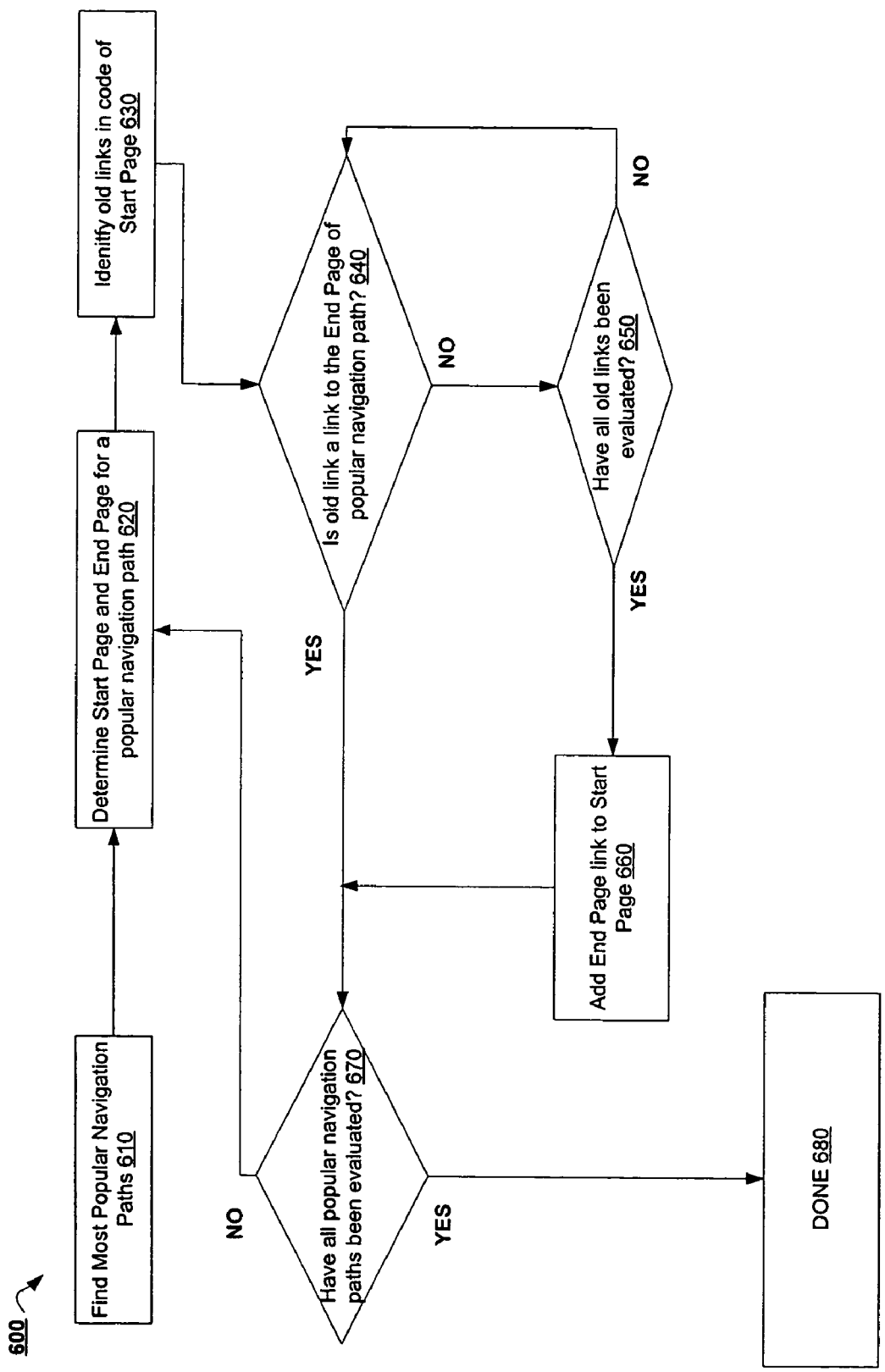
FIG. 6 is a flow diagram depicting one embodiment of a detailed implementation of a method of the invention.

FIG. 6 is a flow diagram illustrating one embodiment of implementing the method depicted in FIG. 5. The method 600 follows the same framework established by method 500 with more elaboration as to the process.

At processing block 610, the popular navigation paths through a network are determined. Once the popular navigation paths have been determined, a Start Page and an End Page for a particular navigation path are determined at processing block 620. The Start Page is the first page of the popular navigation path, and the End Page is the final page of the popular navigation path. At processing block 630, old links or URLs that already exist in the code of the Start Page are identified. At decision block 640, it is determined whether an old link is a link to the End Page. If the old link is a link to the End Page of the popular navigation path, then the process continues to decision block 670.

If the old link is not a link to the End Page, the process continues to decision block 650, where it is determined whether all of the old links have been evaluated. If all of the old links have not been evaluated, then the process returns to decision block 640 to evaluate another old link. If all of the old links have been evaluated, then the process continues to processing block 660, where the End Page link is added to the Start Page, and the process continues to decision block 670.

At decision block 670, it is determined whether all popular navigation paths identified in processing block 610 have been evaluated. If not, the process returns to processing block 620 and continues the process described above with another popular navigation path. If all popular navigation paths have been evaluated at decision block 670, then the process ends at processing block 680.

In one embodiment of the present invention, old links for navigation paths that are no longer popular and that no longer require shortening may be automatically removed. As a result, the network pages will not be cluttered with unnecessary shortcuts. This embodiment may utilize a popular links section of a network page to facilitate automatic updating of popular navigation paths.

Figure 7:
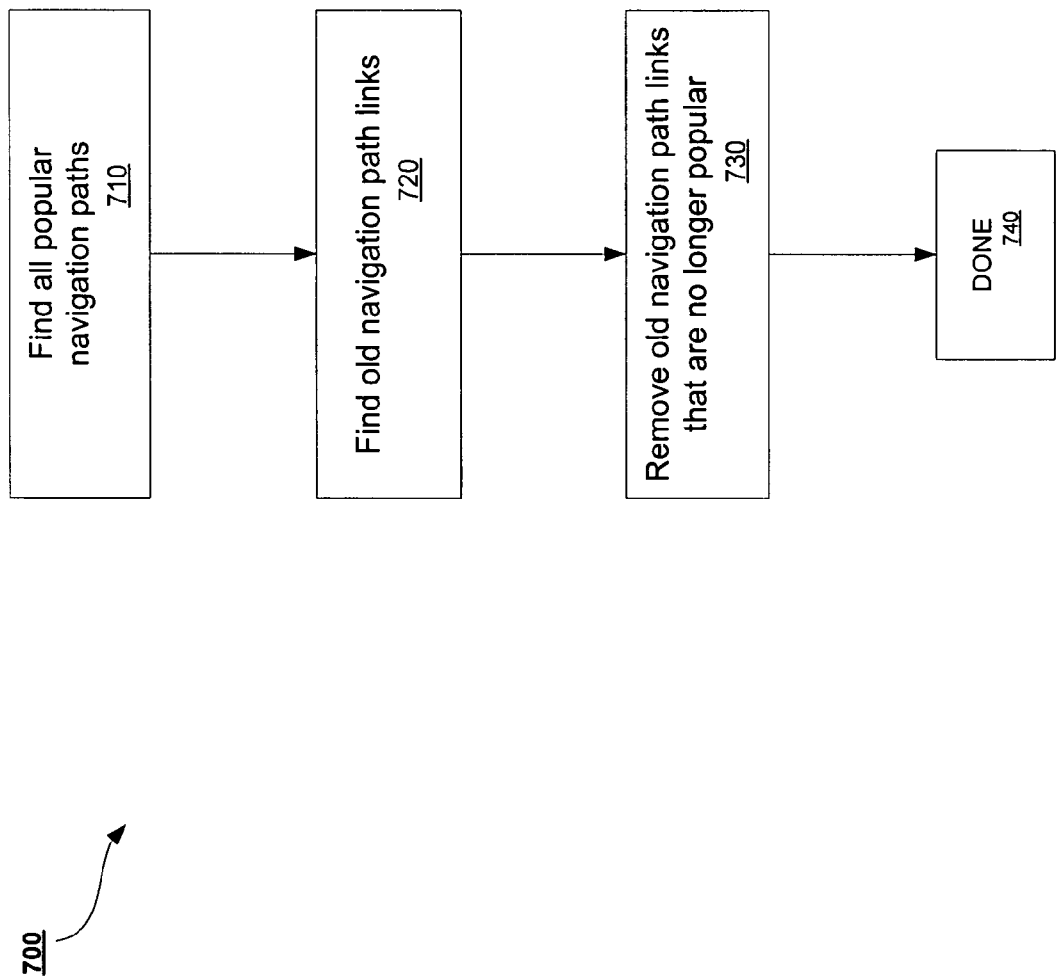
FIG. 7 is a flow diagram depicting a method according to another embodiment of the invention.

FIG. 7 is a flow diagram illustrating one embodiment of updating a popular links section of a network. At processing block 710, all popular navigation paths through a network are determined. Then, at processing block 720, any old navigation path links are determined. All old navigation links that are no longer popular are removed at processing block 730. The process ends at processing block 740.

Figure 8:
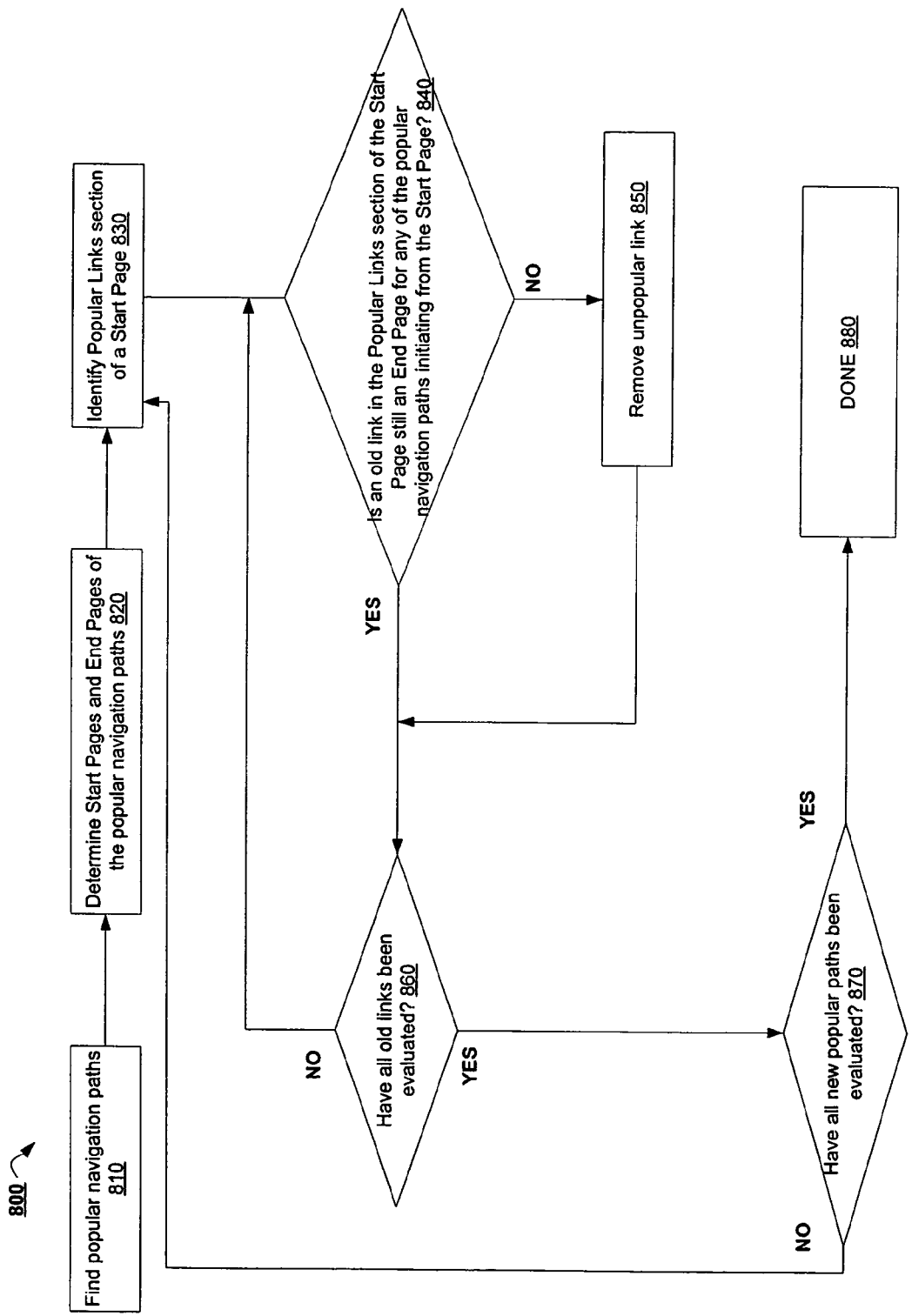
FIG. 8 is a flow diagram depicting one embodiment of a detailed implementation of a method of the invention.

FIG. 8 is a flow diagram illustrating one embodiment of implementing the method depicted in FIG. 7. The method 800 follows the same framework established by method 700 with more elaboration as to the process.

At processing block 810, popular navigation paths of a network are determined. At processing block 820, the Start Pages and the End Pages of all of the popular navigation paths are determined. At processing block 830, a popular links section of a Start Page is identified.

The process continues at decision block 840, where an old link in the popular links section of the Start Page is examined to determine whether it is a link or URL for an End Page of any of the popular navigation paths initiating from the Start Page. If the link is not an End Page for a popular navigation path initiating from the Start Page, then at processing block 850 the link is removed from the popular links section of the Start Page.

If the link is for an End Page of a popular navigation path initiating from the Start Page, then the process continues at decision block 860, where it is determined whether all of the old links in the popular links section of Start Page have been evaluated. If not, then the process returns to decision-block 640 to evaluate another old link. If all of the old links have been evaluated, then the process continues to processing block 870.

At processing block 870, it is determined whether all new popular navigation paths have been evaluated. If not, the process returns to processing block 820 and to evaluate another Start Page of a popular navigation path. If all of the Start Pages of the popular navigation paths have been evaluated, then the process ends at processing block 880.

One embodiment of the present invention may incorporate the processes of FIGS. 5 through 8 into one process that will automatically update a page with links of popular navigation paths, and at the same time automatically remove any older links that now lead to a less popular navigation path.

In some embodiments, various rules may be established for when an End Page link for a popular navigation path may be added to a Start Page. Such rules may include only creating a limited number of links on the Start Page for the popular navigation paths, or only creating links on the Start Page for popular navigation paths that are longer than a certain number of pages. Furthermore, in some embodiments, the automatic updating process may be customized to only take place periodically, such as once a week. One skilled in the art will appreciate the variety of options available to customize and tailor the embodiments of the present invention.

In one embodiment, FIGS. 5 through 8 may be implemented with a combination of collection and aggregation module 220, processing module 225, and information display 230. Although, one skilled in that art will appreciate that the methods presented here are not limited to such an implementation.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method, comprising:
   determining that a particular navigation path comprising a sequential route through a particular sequence of a plurality of pages on a network is a popular navigation path relative to other navigation paths comprising other sequences of pages on the network, wherein:
   the particular sequence of pages of the particular navigation path initiates from a navigation path start page of the particular navigation path, and includes a navigation path end page of the particular navigation path; and
   said determining is based on comparing network traffic through the particular sequence of pages of the particular navigation path against network traffic through the other sequences of pages of the other navigation paths on the network; and
   in response to said determining that the particular navigation path is a popular navigation path relative to the other navigation paths, automatically shortening the particular navigation path, wherein said shortening comprises:
   updating, via a network resource interfaced with the network, the navigation path start page of the particular navigation path, wherein said updating comprises adding to the navigation path start page of the particular navigation path an end page link referring to the navigation path end page of the particular navigation path.

2. The method of claim 1, further comprising:
   determining whether one or more links located on the navigation path start page of the particular navigation path refer to the navigation path end page of the particular navigation path; and
   wherein said updating the navigation path start page of the particular navigation path with the end page link referring to the navigation path end page of the particular navigation path is performed in response to determining that the one or more links located on the navigation path start page of the particular navigation path do not refer to the navigation path end page of the particular navigation path.

3. The method of claim 1, further comprising:
   identifying a section of the navigation path start page of the particular navigation path containing one or more navigation path links;
   determining whether the one or more navigation path links refer to one or more end pages of popular navigation paths initiating from the navigation path start page of the particular navigation path; and
   removing, from the section, a navigation path link that does not refer to the one or more end pages via the network resource.

4. The method of claim 1, wherein the network includes one or more of the following: a Local Area Network (LAN), a Wide Area Network (WAN), an intranet, or the Internet.

5. The method of claim 1, wherein the particular navigation path start page of the particular navigation path and the particular navigation path end page of the particular navigation path each comprise:
   a web page having a file coded in one or more of the following: markup language, extensible markup language, or scripting language; or
   a file viewed using a web browser.

6. The method of claim 1, wherein said comparing network traffic depends at least partially on one or more of the following: numbers of page visits, numbers of users viewing pages, lengths of time spent viewing pages, and user survey results.

7. The method of claim 1, wherein the network resource is a server.

8. The method of claim 1, wherein the updating is scheduled to occur at predetermined time intervals.

9. The method of claim 1, where the end page link is a Uniform Resource Locator.

10. The method of claim 1, wherein said updating the navigation path start page of the particular navigation path occurs only when the number of pages between the navigation path start page of the particular navigation path and the navigation path end page of the particular navigation path is greater than a predetermined number.

11. An article of manufacture, comprising:
    a machine-accessible non-transitory storage medium storing data that, when accessed by a machine, cause the machine to perform operations comprising:
    determining that a particular navigation path comprising a sequential route through a particular sequence of a plurality of pages on a network is a popular navigation path relative to other navigation paths comprising other sequences of pages on the network, wherein:
    the particular sequence of pages of the particular navigation path initiates from a navigation path start page of the particular navigation path, and includes a navigation path end page of the particular navigation path; and said determining is based on comparing network traffic through the particular sequence of pages of the particular navigation path against network traffic through the other sequences of pages of the other navigation paths on the network; and in response to said determining that the particular navigation path is a popular navigation path relative to the other navigation paths, automatically shortening the particular navigation path, wherein said shortening comprises:

updating, via a network resource interfaced with the network, the navigation path start page of the particular navigation path, wherein said updating comprises adding to the navigation path start page of the particular navigation path an end page link referring to the navigation path end page of the particular navigation path.

12. The article of manufacture of claim 11, wherein the machine-accessible non-transitory storage medium further stores data that cause the machine to perform operations comprising:

determining whether one or more links located on the navigation path start page of the particular navigation path refer to the navigation path end page of the particular navigation path; and wherein said updating the navigation path start page of the particular navigation path with the end page link referring to the navigation path end page of the particular navigation path is performed in response to determining that the one or more links located on the navigation path start page of the particular navigation path do not refer to the navigation path end page of the particular navigation path.

13. The article of manufacture of claim 11, wherein the machine-accessible non-transitory storage medium further stores data that cause the machine to perform operations comprising:

identifying a section of the navigation path start page of the particular navigation path containing one or more navigation path links;

determining whether the one or more navigation path links refer to one or more end pages of popular navigation paths initiating from the navigation path start page of the particular navigation path; and removing, from the section, a navigation path link that does not refer to the one or more end pages via the network resource.

14. The article of manufacture of claim 11, wherein the network includes one or more of the following: a Local Area Network (LAN), a Wide Area Network (WAN), an intranet, or the Internet.

15. The article of manufacture of claim 11, wherein said comparing network traffic depends at least partially on one or more of the following: numbers of page visits, numbers of users viewing pages, lengths of time spent viewing pages, and user survey results.

16. A system, comprising:
a hardware processor;
a network interface;
a memory storing program instructions for execution by the hardware processor to perform:

collecting and aggregating data relating to pages a user visits in a network coupled to the network interface;

processing the data to determine that a particular navigation path through a particular sequence of a plurality of pages on the network is a popular navigation path relative to other navigation paths comprising other sequences of pages on the network, wherein:

the particular sequence of pages of the particular navigation path initiates from a navigation path start page of the particular navigation path, and includes a navigation path end page of the particular navigation path; and said processing is based on comparing network traffic through the particular sequence of pages of the particular navigation path against network traffic through the other sequences of pages of the other navigation paths on the network; and in response to said determining that the particular navigation path is a popular navigation path relative to the other navigation paths, automatically shortening the particular navigation path, wherein said shortening comprises:

updating the navigation path start page of the particular navigation path, wherein said updating comprises adding to the navigation path start page of the particular navigation path an end page link referring to the navigation path end page of the particular navigation path.

17. The system of claim 16, wherein processing the data further includes determining whether one or more links on the start page of the particular navigation path refer to the navigation path end page of the particular navigation path.

18. The system of claim 17, wherein said updating the navigation path start page of the particular navigation path with the end page link referring to the navigation path end page of the particular navigation path is performed in response to said determining that the one or more links on the navigation path start page of the particular navigation path do not refer to the navigation path end page of the particular navigation path.

19. The system of claim 16, wherein processing the data further includes determining whether one or more navigation path links on the navigation path start page of the particular navigation path refer to one or more end pages of popular navigation paths initiating from the navigation path start page of the particular navigation path.

20. The system of claim 19, wherein the memory further stores program instructions for execution by the hardware processor to perform removing from the navigation path start page of the particular navigation path a navigation path link that does not refer to the one or more end pages.

* * * * *